(12) United States Patent
Ogawa

(10) Patent No.: US 9,146,702 B2
(45) Date of Patent: Sep. 29, 2015

(54) POST-PROCESSING APPARATUS FOR EXTRACTING RECEIVED PRINT DATA AND FORWARDING THE RECEIVED PRINT DATA TO AN IMAGE FORMING APPARATUS FOR PROCESSING

(71) Applicant: RISO KAGAKU CORPORATION, Tokyo (JP)

(72) Inventor: Hideaki Ogawa, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/184,865

(22) Filed: Feb. 20, 2014

(65) Prior Publication Data

US 2014/0240741 A1  Aug. 28, 2014

(30) Foreign Application Priority Data

Feb. 28, 2013 (JP) ................................. 2013-039499

(51) Int. Cl.
*G06F 3/12* (2006.01)
*G03G 15/00* (2006.01)
(52) U.S. Cl.
CPC .............. *G06F 3/1264* (2013.01); *G03G 15/50* (2013.01); *G06F 3/1208* (2013.01); *G06F 3/1244* (2013.01); *G06F 3/1285* (2013.01); *G03G 15/65* (2013.01)

(58) Field of Classification Search
None
See application file for complete search history.

(56) References Cited

U.S. PATENT DOCUMENTS

2009/0009791 A1* 1/2009 Yamagata et al. ........... 358/1.14
2014/0104655 A1* 4/2014 Nuggehalli et al. ......... 358/1.15

FOREIGN PATENT DOCUMENTS

JP         4455398 B2    4/2010

* cited by examiner

*Primary Examiner* — Eric A Rust
(74) *Attorney, Agent, or Firm* — Greenblum & Bernstein, P.L.C.

(57) ABSTRACT

When there is no post-processing performed in a post-processing device, a print job of original PDL data of a general-purpose data structure is output from a computer to a PDL control unit of an image forming device. While, when there is post-processing performed in the post-processing device, a print job of PDL data of an extended data structure generated by adding attribute data of the post-processing is output from the computer to an extended PDL control unit of the post-processing device. Then, the extended PDL control unit extracts the original PDL data of the general-purpose data structure and the attribute data of the post-processing, from the received print job. The attribute data of the post-processing is used for the post-processing control unit to control a post-processing unit. The original PDL data of the general-purpose data structure is output to the PDL control unit of the image forming device.

4 Claims, 4 Drawing Sheets

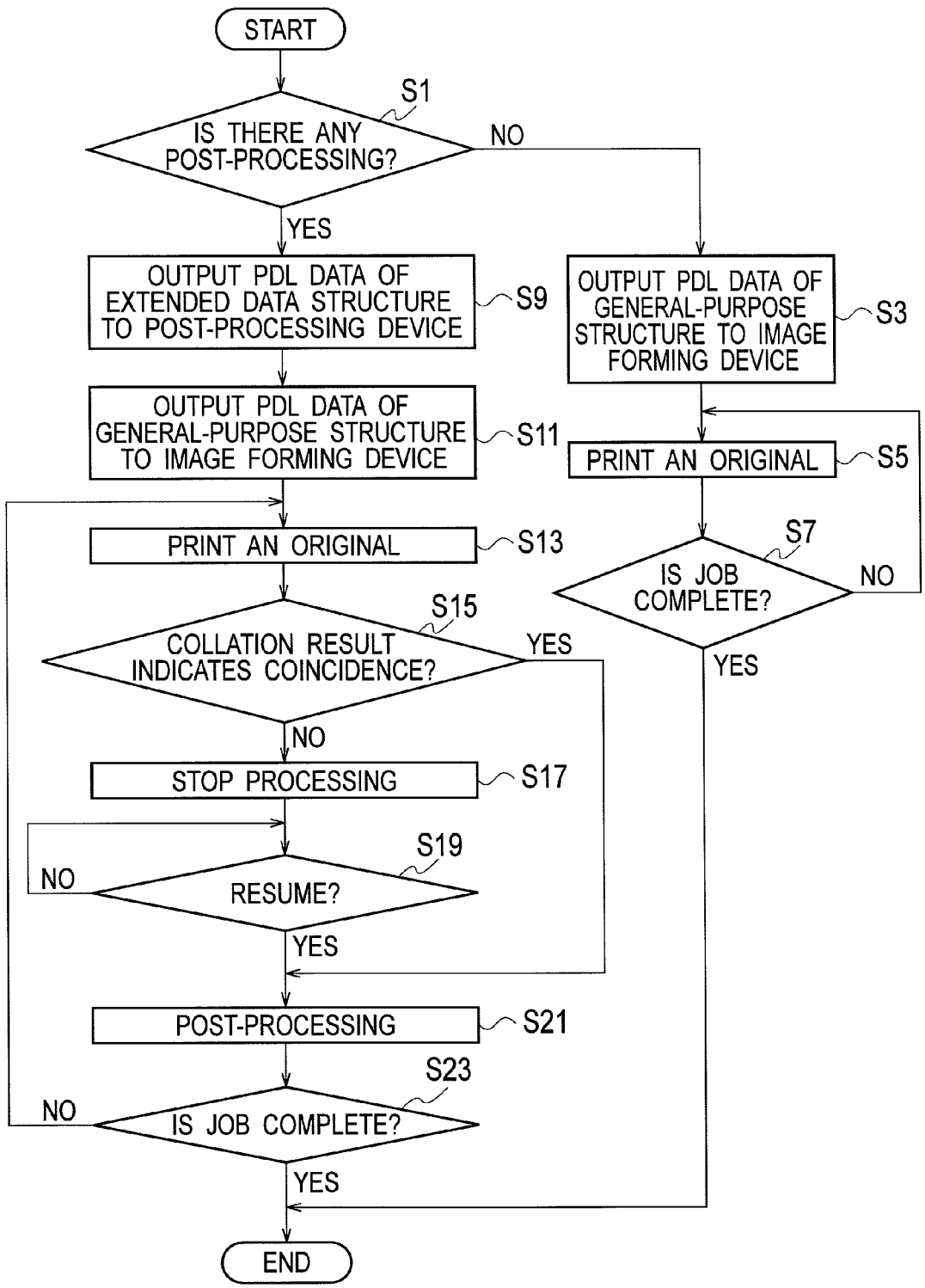

POST-PROCESSING APPARATUS FOR EXTRACTING RECEIVED PRINT DATA AND FORWARDING THE RECEIVED PRINT DATA TO AN IMAGE FORMING APPARATUS FOR PROCESSING

FIELD OF THE INVENTION

The present invention relates to a post-processing device used while being connected to an image forming device and a post-processing method after forming an image.

RELATED BACKGROUND OF THE INVENTION

An image forming device that forms an image on a print sheet by a print job may be used as an image forming system while being connected to a post-processing device. As the post-processing device, there are conventionally known ones that mainly perform processing, such as sorting, stapling, and/or punching, in printing multiple sheets.

However, in recent years, the application range of the image forming system tends to expand because the image forming device has been achieving high-speed processing and the like, and accordingly there are increasingly more chances to newly provide a post-processing device that achieves high-speed processing, multi-functions, or coping with a new application. However, in an image forming device attempting to constitute an image forming system together with a post-processing device, cooperative use with such a subsequent post-processing device may not be taken into consideration.

There is already proposed an image forming device as follows (e.g., Patent Literature 1). Here, if functional information of a post-processing device desired to be cooperatively used is additionally registered, then based on this information, a printed sheet after image formation is discharged in a format suitable for processing performed by the post-processing device that is a cooperative partner, and a job ticket that is the source of a work procedure manual of the post-processing device is generated and transmitted to the post-processing device.

PRIOR ART DOCUMENT

Patent Literature

[Patent Literature 1] Japanese Patent No. 4455398

SUMMARY OF THE INVENTION

Problems to be Solved by the Invention

When a document prepared with a user terminal, such as a personal computer, is printed with an image forming device, PDL data described by a page description language (PDL), such as PostScript, is used. This page description language is a programming language which, in printing an original, such as a document and/or an image, prepared on a computer, describes an output image to an image forming device and instructs the image forming device.

The PDL data of an original employs a general-purpose data structure. In an image forming device that received a print job of the original PDL data, a PDL control unit, in printing an original, converts the PDL data, such as the positional information and format information regarding a text or a figure, to a bitmapped image using font data which the PDL control unit retains.

In contrast, the above-described related art is premised on that an image forming device receives a print job including information regarding processing performed by a post-processing device. Accordingly, a user terminal needs to output PDL data, which is generated by adding attribute data of post-processing to the original PDL data of the general-purpose data structure, in an extended data structure. In conjunction with this, the image forming device needs to include an extended PDL control unit capable of processing the PDL data of the extended data structure.

However, an image forming device, which does not assume the cooperative use with a subsequent post-processing device, may not include the extended PDL control unit. In this case, it is necessary to cause the image forming device to have compatibility with the interface of a user terminal by using an extension interface having the extended PDL control unit mounted thereon. Moreover, when an image forming device does not have a connection port for the extension interface, it is impossible to provide interface compatibility itself with a user terminal.

If it is impossible to provide the interface compatibility between a user terminal and an image forming device, then even if a print job of PDL data of the extended data structure including the attribute data of post-processing is output from the user terminal, the image forming device cannot recognize this attribute data and accordingly cannot transmit this attribute data to a post-processing device, neither. Accordingly, even if the processing performed by the post-processing device is determined by the user terminal and the relevant data is included in a print job and the resulting print job is output, the post-processing device cannot perform this post-processing.

The present invention has been made in view of the above-described circumstances, and provides a post-processing device which, even if an image forming device to be connected does not have interface compatibility, can post-process contents defined by a print job of PDL data of an extended data structure.

Means for Solving the Problems

In order to achieve the above described purpose, according to an aspect of the present invention, there is provided a post-processing device which, based on a print job to generate PDL data of an extended data structure (e.g., PDL data of a data structure of FIG. 3) by adding post-processing PDL data regarding post-processing to original PDL data (e.g., PDL data of a data structure of FIG. 2) of a general-purpose data structure regarding print of an original, post-processes a printed sheet output from an image forming device (e.g., an image forming device 200 of FIG. 1) that printed the original using the original PDL data, the post-processing device including: a post-processing PDL data extraction unit configured to extract the post-processing PDL data from an input print job to obtain extracted post-processing PDL data; an original PDL data extraction unit configured to extract the original PDL data from the print job to obtain extracted original PDL data; a post-processing unit configured to post-process the printed sheet based on the extracted post-processing PDL data; and an original PDL data output unit configured to output the extracted original PDL data to the image forming device.

The post-processing device of the present invention preferably further includes: an original image data acquisition unit (e.g., a CCD camera 360 of FIG. 1) configured to acquire original image data from the printed sheet to obtain acquired original image data; an original image data generation unit (e.g., a PDL data output unit 330 of FIG. 1) configured to generate original image data from the original PDL data that was output to the image forming device to obtain generated original image data; a collation unit configured to collate the acquired original image data with the generated original image data; and a stop unit (e.g., a post-processing control unit 340 of FIG. 1) configured to stop post-processing of the post-processing unit when a result of collation of the acquired original image data with the generated original image data indicates non-coincidence.

The post-processing device of the present invention preferably further includes a stoppage notification unit (e.g., the post-processing control unit 340 of FIG. 1) configured to notify the image forming device of a stoppage of post-processing by the post-processing unit and of a page of the acquired original image data and the generated original image data, which do not coincide with each other as the result of collation by the collation unit.

BRIEF DESCRIPTION OF THE DRAWINGS

FIG. 4 is a flowchart showing a procedure of printing and post-processing performed in the printer system of FIG. 1.

DESCRIPTION OF THE PREFERRED EMBODIMENTS

Hereinafter, an embodiment of the present invention will be described with reference to the accompanying drawings.

Figure 1:
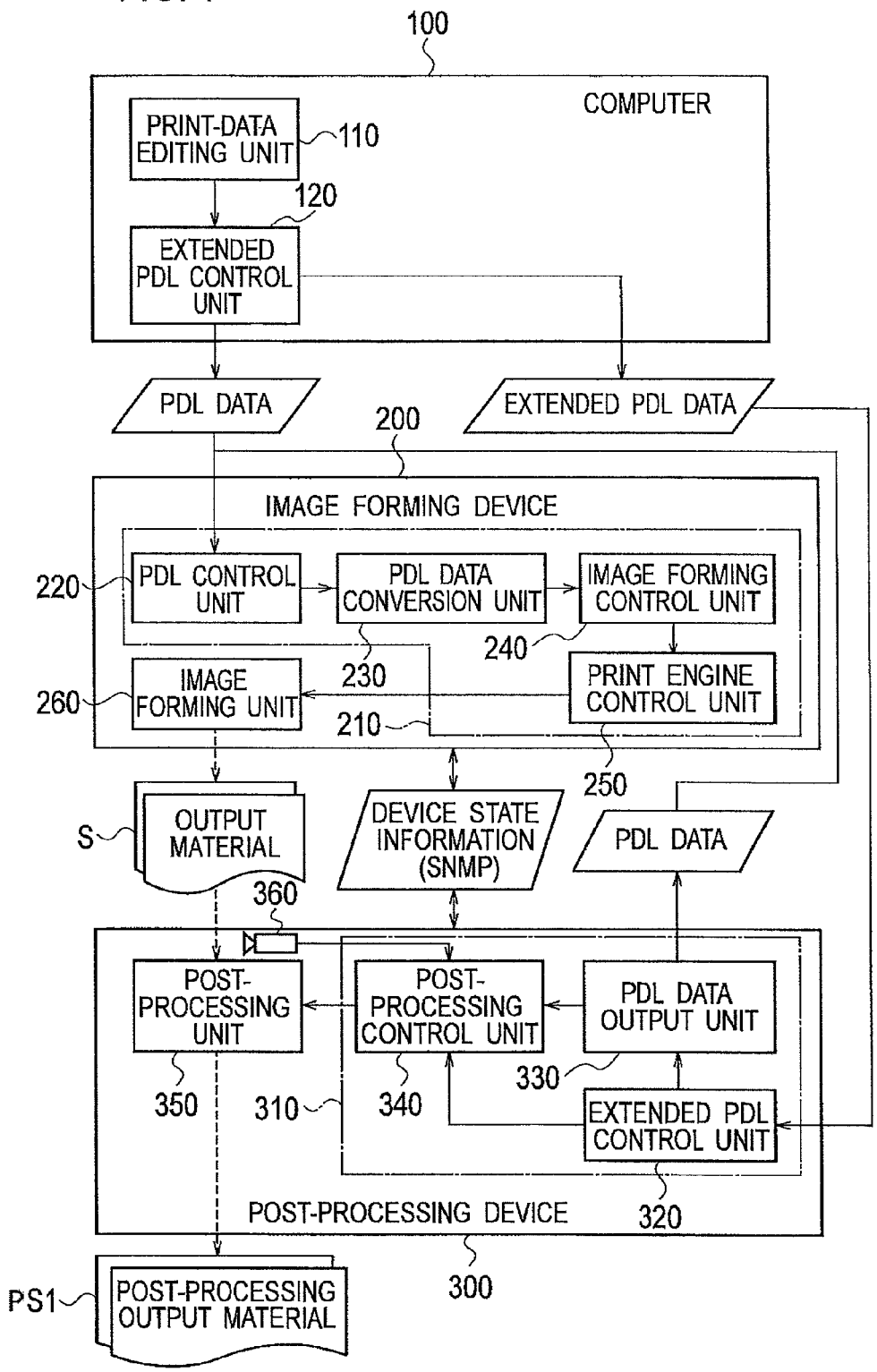
FIG. 1 is a block diagram showing a schematic configuration of a control system of a printer system according to an embodiment of the present invention.

FIG. 1 is a block diagram showing a schematic configuration of a control system of a printer system according to an embodiment of the present invention.

A printer system 1 of the present embodiment shown in FIG. 1 includes: a computer 100 (user terminal) that outputs a print job; an image forming device 200 which, based on the print job, performs printing on a non-illustrated print sheet; and a post-processing device 300 that performs post-processing on a printed sheet S printed by the image forming device 200, connected to a non-illustrated network, respectively.

The computer 100 includes a personal computer having therein, for example, a CPU, a ROM, a RAM, a hard disk, and the like. The computer 100 includes a print-data editing unit 110 and an extended PDL control unit 120.

The CPU implements the print-data editing unit 110 in the computer 100, for example by executing application software (program) stored in the hard disk. The print-data editing unit 110 can generate data of an original including a text, a figure, a photograph, and the like, based on data that is input using an input unit, such as a keyboard or a mouse.

The CPU of the computer 100 implements the extended PDL control unit 120 in the computer 100, for example by executing a printer driver program stored in the hard disk. The printer driver program corresponds to the image forming device 200 and the post-processing device 300. On the printer driver program, a setting item related to the image forming device 200 and a setting item related to the post-processing device 300 can be specified.

The extended PDL control unit 120, in printing an original generated by the print-data editing unit 110, generates a print job and outputs the same to a network. At this time, when there is no specified setting item related to the post-processing device 300 (there is no post-processing to be performed in the post-processing device 300), the extended PDL control unit 120 outputs to the image forming device 200 a print job of PDL data of the original based on a general-purpose data structure.

Figure 2:
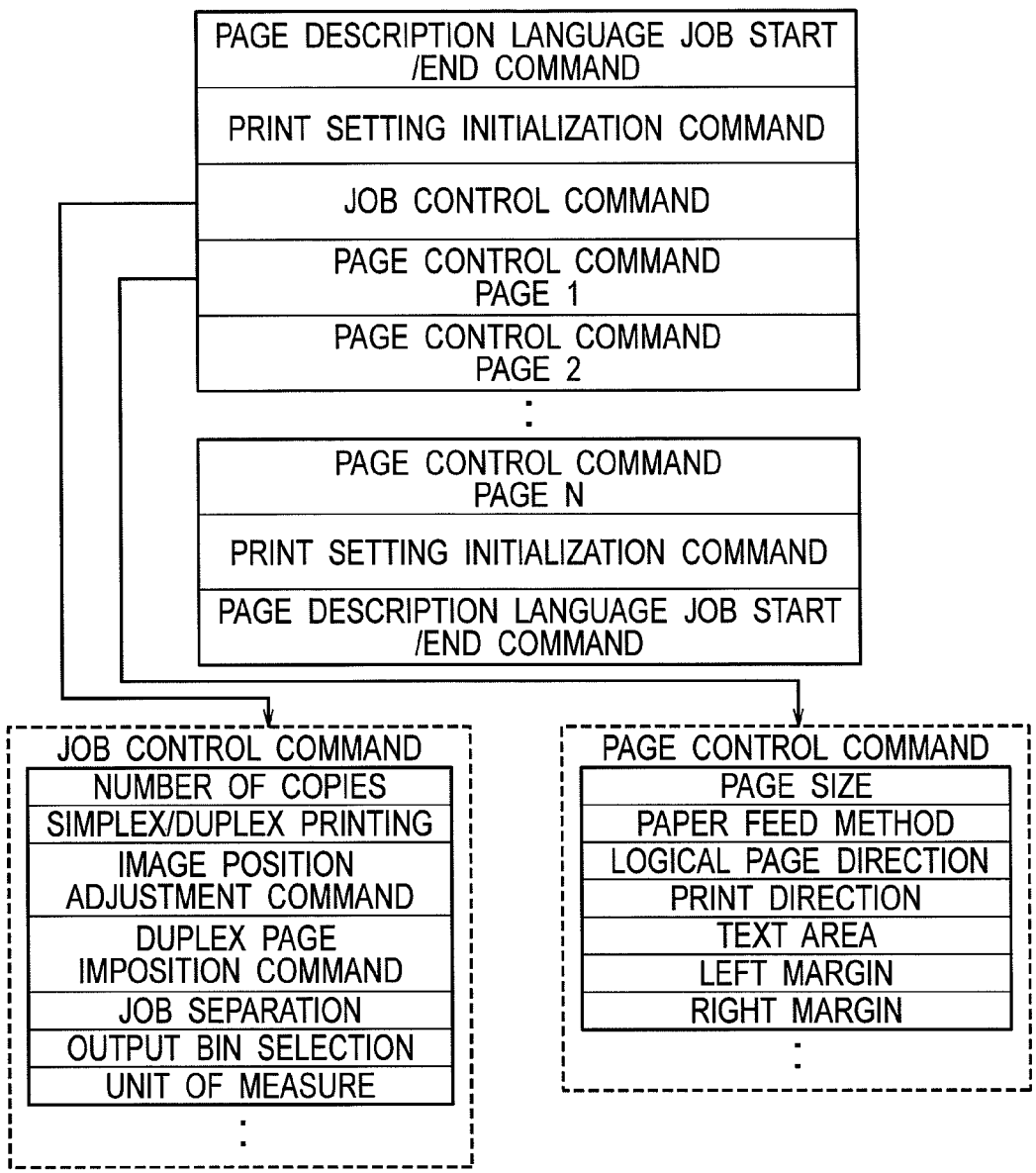
FIG. 2 is an explanatory view showing a data structure of PDL data of an original (original PDL data) of a general-purpose data structure which an extended PDL output unit of a computer of FIG. 1 outputs.

FIG. 2 is an explanatory view showing a data structure of PDL data (original PDL data) of an original based on the general-purpose data structure which the extended PDL control unit 120 outputs. Here, the original PDL data described by PCL (Printer Command Language) is illustrated.

In the original PDL data of the general-purpose data structure described by PCL, "number of copies", "simplex/duplex printing", "image position adjustment command", "duplex page imposition command", "job separation", "output bin selection", "unit of measure", and the like are defined in "job control command". Moreover, "page size", "paper feed method", "logical page direction", "print direction", "text area", "left margin", "right margin", and the like are defined in "page control command".

On the other hand, when there is a specified setting item related to the post-processing device 300 (there is post-processing to be performed in the post-processing device 300), the extended PDL control unit 120 outputs to the post-processing device 300 a print job of PDL data based on the extended data structure. In this print job, the data structure of PDL data is converted from the general-purpose data structure to the extended data structure by adding attribute data of post-processing (post-processing PDL data) to the original PDL data based on the general-purpose data structure. The post-processing PDL data is information corresponding to a specified setting item related to the post-processing device 300.

Figure 3:
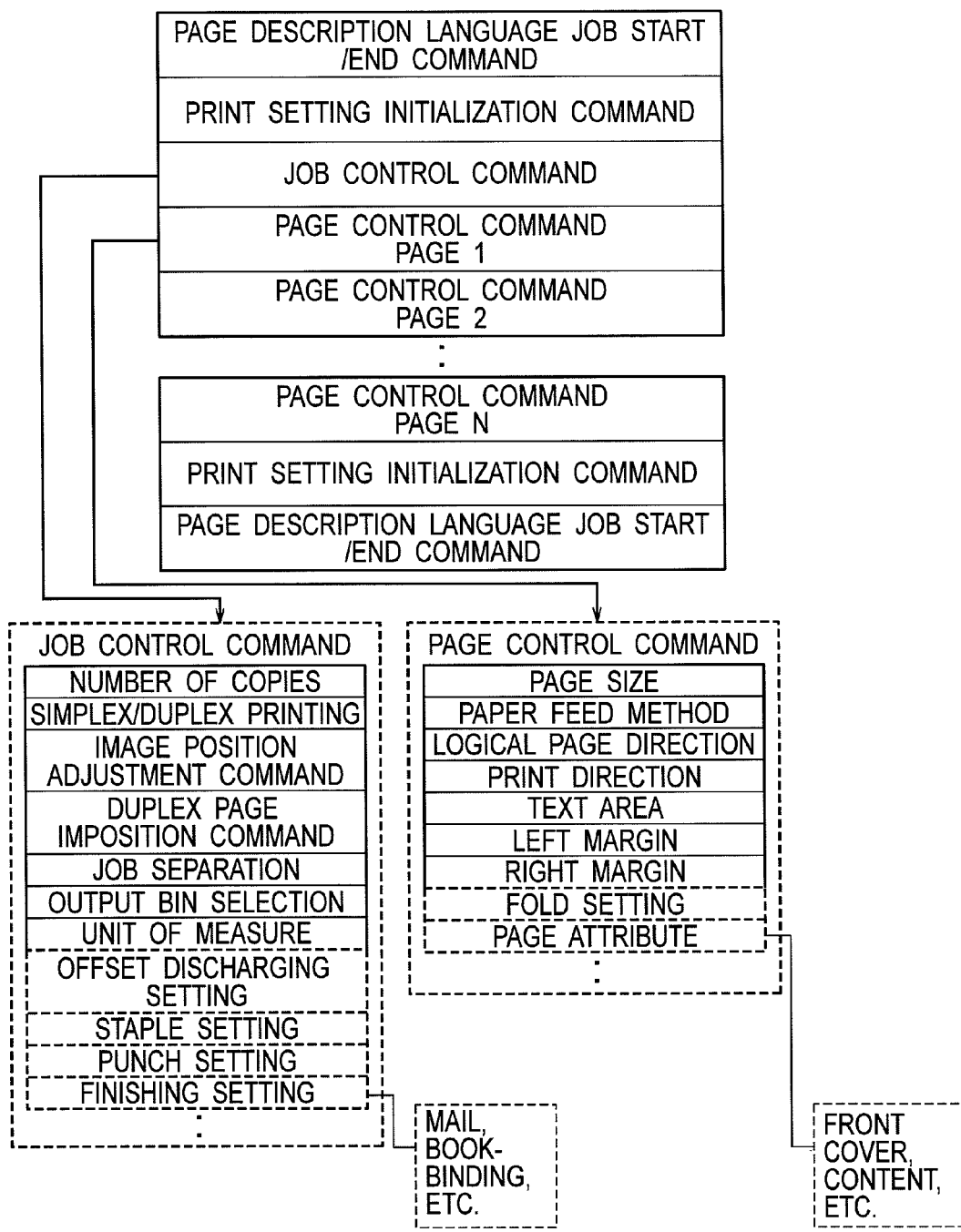
FIG. 3 is an explanatory view showing a data structure of PDL data of an extended data structure generated by adding attribute data of post-processing to the original PDL data of the general-purpose data structure of FIG. 2.

FIG. 3 is an explanatory view showing a data structure of PDL data based on the extended data structure which the extended PDL control unit 120 outputs. Here, there is illustrated a data structure in a case of PDL data of the extended data structure generated as a result of adding post-processing PDL data to the original PDL data of the general-purpose data structure of FIG. 2.

In the PDL data of the extended data structure shown in FIG. 3, in "job control command", there are defined "unit of measure", followed by "offset discharging setting", "staple setting", "punch setting", "finishing setting", . . . , and so on associated with the post-processing in the post-processing device 300. Moreover, in "page control command", there are defined "right margin", followed by "fold setting", "page attribute", . . . , and so on again associated with the post-processing in the post-processing device 300.

Note that, in the PDL data, one and the same computer language is used regardless of the general-purpose data structure or the extended data structure. Moreover, as an output destination of a print job by the extended PDL control unit 120 shown in FIG. 1, a node name of the image forming device 200 or the post-processing device 300 on a network can be defined in header information of the print job.

The image forming device 200 prints an image of an original on a non-illustrated print sheet with an inkjet method, an electrophotographic method, a stencil printing method, or the like. The image forming device 200 includes a control unit 210 that controls the whole operation, and an image forming unit 260 that forms an image on a print sheet.

The control unit 210 includes a computer having, for example, a CPU, a ROM, a RAM, a hard disk, and the like. The control unit 210 includes a PDL control unit 220, a PDL data conversion unit 230, an image forming control unit 240, and a print engine control unit 250.

The CPU implements the PDL control unit 220, the PDL data conversion unit 230, the image forming control unit 240, and the print engine control unit 250 in the computer of the control unit 210, for example by executing a program stored in the hard disk.

To the PDL control unit 220, original PDL data of the general-purpose data structure is input from the computer 100 or the post-processing device 300. The input original PDL data is converted to image data of an original image, in the PDL data conversion unit 230, and is output to the image forming control unit 240. The image forming control unit 240 controls the image forming unit 260 using the print engine control unit 250 to print the image of an original on a print sheet.

Note that, the image forming control unit 240, when jam (paper jam) occurs in a print sheet inside the image forming device 200, stops an operation of printing the original image performed by the image forming unit 260 or an operation of outputting (discharging) the printed sheet S (an output material). Notification of the stoppage of these operations is provided to the post-processing device 300. Moreover, the image forming control unit 240 stops the print operation or the output operation also when it receives from the post-processing device 300 a notification of the stoppage of a post-processing operation to be described later.

In this case, the image forming control unit 240, after dissolving a jammed state inside the image forming device 200 or when it receives from the post-processing device 300 a stoppage release notification to be described later, resumes the stopped operation. A resumption page of the print operation is determined by the image forming control unit 240 in accordance with the place, where the print sheet jam occurs, inside the image forming device 200. Moreover, when the operation is stopped in accordance with the notification provided from the post-processing device 300, the image forming control unit 240 determines the resumption page of the print operation based on the information for identifying the page of the printed sheet S, notification of which is provided from the post-processing device 300 together with the stoppage release notification.

The above-described notification of operation stoppage that is provided to the post-processing device 300 by the image forming control unit 240 can be performed using a general-purpose protocol, such as an SNMP (Simple Network Management Protocol).

The post-processing device 300 includes: a paper feed unit (not shown) connected to a paper discharge unit (not shown) of the image forming device 200; a post-processing unit 350 that performs various types of post-processing (offset paper discharge, staple processing, punch processing, finishing processing, and the like) on the printed sheet S fed from the image forming device 200 to the paper feed unit; and the like. Moreover, the post-processing device 300 includes a control unit 310 that controls the whole operation.

The control unit 310 includes a computer having, for example, a CPU, a ROM, a RAM, a hard disk, and the like. The control unit 310 includes an extended PDL control unit 320, a PDL data output unit 330, and a post-processing control unit 340. To the control unit 310, a CCD camera 360 (original image data acquisition unit) that captures an original image of the printed sheet S fed from the image forming device 200 is connected.

The CPU implements the extended PDL control unit 320, the PDL data output unit 330, and the post-processing control unit 340 in the computer of the control unit 310, for example by executing a program stored in the hard disk.

To the extended PDL control unit 320 (a post-processing PDL data extraction unit, an original PDL data extraction unit), a print job based on the PDL data of the extended data structure is input from the computer 100. The extended PDL control unit 320 analyzes the PDL data of the extended data structure, extracts from the input print job the original PDL data of the general-purpose data structure to obtain the extracted original PDL data. Moreover, the extended PDL control unit 320 analyzes the PDL data of the extended data structure, extracts from the input print job the attribute data of post-processing (the post-processing PDL data) to obtain the extracted post-processing PDL data.

The extracted original PDL data obtained from the PDL data of the extended data structure by the extended PDL control unit 320 is output to the PDL control unit 220 of the image forming device 200 by the PDL data output unit 330 (the original PDL data output unit). Moreover, the PDL data output unit 330 (the original image data generation unit) converts the extracted original PDL data to the image data of the original image (to the generated original image data), and outputs the same to the post-processing control unit 340. To the post-processing control unit 340, the extracted post-processing PDL data obtained by the extended PDL control unit 320 and the data of the original image (acquired original image data) of the printed sheet S which the CCD camera 360 captured are input.

The post-processing control unit 340 controls the post-processing unit 350 to perform post-processing (offset paper discharge, staple processing, punch processing, finishing processing, or the like) on the printed sheet S, and discharge the resulting sheet S as a post-processing output material PS1.

Here, the processing is described in detail, which the post-processing control unit 340 performs when the post-processing device 300 performs the post-processing on the printed sheet S. The post-processing control unit 340 controls the post-processing which the post-processing unit 350 performs on the printed sheet S fed from the image forming device 200. With this control, the post-processing unit 350 can perform on the printed sheet S the post-processing corresponding to the attribute data of post-processing (extracted post-processing PDL data) output from the extended PDL control unit 320. In this attribute data, the function (attribute) of the post-processing and the content (attribute value) of the post-processing which the post-processing unit 350 is caused to perform are defined.

When the post-processing unit 350 performs the post-processing on the printed sheet S, the post-processing control unit 340 determines whether or not an original image printed on the printed sheet S output from the image forming device 200, which the CCD camera 360 captured, is the correct content. The determination of the content of the original image of the printed sheet S is performed by collating the image data (the generated original image data) of the original image, which the PDL data output unit 330 converted from the original PDL data within the PDL data of the extended data structure, with the data (acquired original image data) of the original image which the CCD camera 360 captured.

Specifically, the image data of an original image of a page corresponding to the attribute data of the post-processing, which the post-processing unit 350 is scheduled to perform, is collated with the data of the original image of a page, which the CCD camera 360 imaged from the printed sheet S on which the post-processing unit 350 is scheduled to perform the post-processing.

With this collation, when the data of the original image printed on the printed sheet S output from the image forming device 200, which the CCD camera 360 captured, does not coincide with the image data of the original image output from the PDL data output unit 330, the post-processing control unit 340 stops the post-processing performed by the post-processing unit 350. Accordingly, when the original image of the printed sheet S does not have an appropriate content due to a print failure or the like, or when jam occurs in the printed sheet S inside the post-processing device 300 and thus the printed sheet S is no longer fed to the post-processing unit 350 in a normal order, the post-processing with respect to the printed sheet S is stopped.

When the post-processing is stopped, the post-processing control unit 340 notifies (provides a stoppage notification to) the image forming device 200 of the fact that the post-processing has been stopped.

Note that, when the post-processing has been stopped due to the occurrence of jam of the printed sheet S inside the post-processing device 300, the post-processing control unit 340, after the printed sheet S not yet post-processed inside the post-processing device 300 is manually or automatically removed entirely from a transfer system, notifies the image forming device 200 of a page of the printed sheet S whose post-processing is stopped (provides a stoppage release notification to the image forming device 200).

In this case, when a page (page on the original image data output from the PDL data output unit 330) on data of the printed sheet S, on which the post-processing unit 350 is scheduled to perform the post-processing, differs from a page of the printed sheet S which the CCD camera 360 actually captured, either page having a smaller number is notified to the image forming device 200 as a stoppage release notification. Thus, the image forming device 200 can be caused to reprint from a page not yet post-processed, and the post-processing can be resumed from the next page of the last page already post-processed.

Subsequently, when a head page, where the post-processing is stopped, and the subsequent pages are reprinted by the image forming device 200 and the resulting printed sheet S is fed from the image forming device 200, alternatively when this fact is notified from the image forming device 200, the post-processing control unit 340 causes the post-processing unit 350 to resume the stopped post-processing.

The above-described stoppage notification and stoppage release notification provided to the image forming device 200 by the post-processing control unit 340 can be performed using a general-purpose protocol, such as SNMP, as with the notification by the image forming control unit 240 of the image forming device 200.

By stopping the post-processing as described above, the printed sheet S, on which an original image results in having an inappropriate content due to a print failure or the like, or the printed sheet S, which has not been fed to the post-processing unit 350 in a normal order due to the occurrence of jam inside the post-processing device 300, is prevented from being post-processed by the post-processing unit 350, as it is, and being output (discharged) as an inappropriate post-processing output material PS1.

For example, when the post-processing unit 350 of the post-processing device 300 performs post-processing for enclosing contents into an envelope and outputting a sealed letter as the post-processing output material PS1, whether or not the envelope matches the content thereof or whether or not there is no defect in the printed state of the content due to a print failure or the like cannot be externally checked from the state of the sealed letter.

However, by the post-processing control unit 340 performing the above-described control, the above-described item can be checked immediately before enclosing the content into the envelope and the post-processing can be stopped as required. Therefore, a sealed letter, wherein the envelope does not match the content thereof, or a sealed letter having a defect, or a sealed letter having a defect in the printed state of the content thereof is prevented from being output as it is.

Note that, when an original image includes a unique bar code (not shown) for each printed sheet S, in place of the CCD camera 360, a bar code reader (not shown) that reads the bar code on the printed sheet S fed from the image forming device 200 may be employed as the one corresponding to the original image data acquisition unit.

For example, if the post-processing output material PS1 is the above-described sealed letter, in the case where a bar code including an ID for each sealed letter is printed on the printed sheet S serving as the envelope of each sealed letter or on the printed sheet S serving as the content, this bar code can be utilized for collation, in place of an original image. This bar code is printed, as an original (a part thereof), on an envelope or on the printed sheet S serving as the content. Accordingly, the extracted original PDL data obtained from the PDL data of the extended data structure by the extended PDL control unit 320 includes data of the bar code.

In this case, the post-processing control unit 340 collates the content (the acquired original image data) of the bar code read by the bar code reader with the data (generated original image data) of the bar code in the extracted original PDL data.

If the contents of the both bar codes do not coincide with each other by collation, it can be recognized that the printed sheet S does not match the content of the post-processing to be performed on the printed sheet S. Moreover, if a bar code reader cannot read the bar code of the printed sheet S, it can be recognized that there is a defect in the bar code image on the printed sheet S due to a print failure or the like.

As apparent also from the above description, in the present embodiment, the post-processing control unit 340 corresponds to the collation unit, the stop unit, and the stoppage notification unit.

Next, the procedure of printing and post-processing executed in the printer system 1 is described with reference to a flow chart of FIG. 4. First, in printing an original generated by the print-data editing unit 110 of the computer 100, the extended PDL control unit 120 of the computer 100 checks whether or not there is any specified setting item related to the post-processing device 300 on a printer driver program (Step S1).

When there is no specified setting item related to the post-processing device 300 ("NO" in Step S1), the extended PDL control unit 120 outputs a print job of the original PDL data of the general-purpose data structure to the image forming device 200 (Step S3).

The PDL control unit 220 of the image forming device 200 causes the PDL data conversion unit 230 to convert the original PDL data of the received print job to the image data of the original image, and causes the image forming control unit 240 and the print engine control unit 250 to control to print the original images of all the pages of the print job on the print sheet (Steps S5 and S7), and completes a series of print processings.

On the other hand, when there is a specified setting item related to the post-processing device 300 ("YES" in Step S1), the extended PDL control unit 120 of the computer 100 outputs a print job of PDL data of the extended data structure including the original PDL data and the attribute data of the post-processing (post-processing PDL data) to the post-processing device 300 (Step S9).

The extended PDL control unit 320 of the post-processing device 300 extracts the original PDL data of the general-purpose data structure from the received print job, and outputs the same to the PDL control unit 220 of the image forming device 200 (Step S11). The PDL control unit 220 of the image forming device 200 causes the PDL data conversion unit 230 to convert the received original PDL data of the general-purpose data structure to the image data of the original image, and causes the image forming control unit 240 and the print engine control unit 250 to control to print the original image of the print job on the print sheet (Step S13).

Moreover, the extended PDL control unit 320 collates an original image which the CCD camera 360 captured from the printed sheet S, on which the post-processing unit 350 is scheduled to perform the post-processing, with an original image of the image data, which the PDL data output unit 330 converted, of a page corresponding to the attribute data indicative of the content of the post-processing which the post-processing unit 350 is scheduled to perform, and checks whether or not the both contents coincide with each other (Step S15).

When the both contents coincide with each other ("YES" in Step S15), the flow proceeds to Step S21 to be described later, where the post-processing corresponding to the attribute data of the post-processing, which the extended PDL control unit 320 extracted from the print job, with respect to the printed sheet S fed from the image forming device 200 is started by the post-processing unit 350.

On the other hand, when the both contents do not coincide with each other ("NO" in Step S15), the post-processing started in Step S21 is stopped, and a stop processing for outputting to the image forming device 200 a stoppage notification indicative of this fact is executed by the post-processing control unit 340 (Step S17). Subsequently, if the post-processing control unit 340 outputs a stoppage release notification to the image forming device 200 and is ready for resuming the post-processing ("YES" in Step S19), the extended PDL control unit 320 again causes the post-processing unit 350 to start (resume) the post-processing with respect to the printed sheet S fed from the image forming device 200.

If the procedure from Step S13 through the subsequent steps described above is complete for all the pages of the print job ("YES" in Step S23), a series of print processings are completed.

In this manner, according to the printer system 1 of the present embodiment, when there is no post-processing to be performed in the post-processing device 300, a print job of the original PDL data of the general-purpose data structure is output to the image forming device 200 from the computer 100.

On the other hand, when there is post-processing to be performed in the post-processing device 300, a print job of PDL data of the extended data structure generated by adding attribute data of the post-processing is output to the post-processing device 300 from the computer 100. Then, in the post-processing device 300, the attribute data of the post-processing (post-processing PDL data) is extracted from the print job, i.e., from the PDL data based on the extended data structure of the received print job, and the extracted post-processing PDL data is obtained. This extracted post-processing PDL data is used when the post-processing control unit 340 controls the post-processing unit 350. As a result, in accordance with the content corresponding to the extracted post-processing PDL data, a printed sheet on which the original is printed by the image forming device is post-processed by the post-processing unit.

The attribute data of the post-processing (post-processing PDL data) included in the PDL data of the extended data structure, which is sent from the computer 100, is data with which the image forming device 200 does not have interface compatibility. In the above-described processing, the image forming device 200 does not receive the attribute data of the post-processing (post-processing PDL data), instead the post-processing device 300 receives this attribute data. The post-processing device 300 receives attribute data of the post-processing (post-processing PDL data) directly from the computer 100 instead of via the image forming device 200, so that the post-processing corresponding to the attribute data can be performed on the printed sheet S.

Moreover, the post-processing device 300 extracts, from PDL data of the expansion structure of the print job received from the computer 100, the original PDL data of the general-purpose data structure with which the image forming device 200 has interface compatibility, and outputs the same to the image forming device 200 as the extracted original PDL data. This extracted original PDL data has the general-purpose data structure, with which the image forming device has interface compatibility. That is, the image forming device 200 will receive, from the post-processing device 300, only the original PDL data of the general-purpose data structure having compatibility in interface from among the PDL data of the extended data structure that does not have interface compatibility, so that the image processing device 200 can print the original image using the original PDL data of this general-purpose data structure.

As described above, PDL data of the extended data structure including an original and the data of post-processing is sent from the computer 100 to the image forming device 200 and the post-processing device 300 as a print job, in accordance with the content of the PDL data.

In particular, even if the image forming device does not have interface compatibility with respect to PDL data of the extended data structure, the image forming device receives from the computer 100 or the post-processing device 300 only the original PDL data of the general-purpose data structure extracted from the PDL data of the extended data structure, so that the image forming device can print the original on a print sheet.

Furthermore, even if an image forming device to be connected does not have interface compatibility, the image forming device can post-process the content that is defined by a print job based on PDL data of the extended data structure.

Based on this print job, an original can be printed by the image forming device 200 that does not have interface compatibility, and post-processing can be performed by the post-processing device 300 in conjunction with the image forming device 200.

Thus, in the case where the subsequent post-processing device 300 is used in combination with the image forming device 200, even if a print job, which the computer 100 outputs, including the attribute data of the post-processing performed by the post-processing device 300 cannot be output to the image forming device 200 because the subsequent post-processing device 300 does not have interface compatibility with the computer 100, the post-processing device 300 can be used in combination, without newly providing an extension interface or the like in the image forming device 200.

Moreover, in the present embodiment, an original content of the printed sheet S output from the image forming device 200 that is captured by the CCD camera 360 is collated with the content of an original image indicated by the original PDL data of a print job, the attribute data of the post-processing of which the extended PDL control unit 320 extracted. When the both contents do not coincide with each other, the post-processing control unit 340 stops the post-processing.

That is, in the post-processing device 300, the original PDL data of the general-purpose data structure output to the image forming device 200 is analyzed, and the original image data which the original PDL data indicates is generated and the generated original image data is obtained. Moreover, the original image data is acquired from on the printed sheet S to be post-processed and the acquired original image data is obtained. The generated original image data is collated with the acquired original image data, and if non-coincidence between the acquired original image data and the generated original image data is detected, then the post-processing device 300 itself stops the post-processing.

Therefore, whether or not the content of the post-processing which the post-processing device 300 performs on the printed sheet S is the content corresponding to this printed sheet S can be checked through the collation of the acquired original image data that is the original image data on the printed sheet S with the generated original image data obtained by generating from the original PDL data in the PDL data of the extended data structure including post-processing data. Moreover, when the content of the printed sheet S does not coincide with the content of the corresponding post-processing, this fact can be detected immediately before post-processing and the post-processing can be promptly stopped inside the post-processing device 300.

Therefore, for example, even if the original image of the printed sheet S output from the image forming device 200 has a defect due to a print failure or the like, the post-processing of this printed sheet S and inappropriately outputting of the resulting printed sheet S can be suppressed. Moreover, even if the content of post-processing performed on the printed sheet S shifts to the content of post-processing with respect to another printed sheet S that is fed therebefore or thereafter, for example because a jam occurs to the printed sheet S output from the image forming device 200 inside the post-processing device 300, inappropriately outputting of the printed sheet S that has been post-processed as it is can be suppressed.

In addition, because the original image data on the printed sheet S output from the image forming device 200 is collated with the original image data of the original PDL data that is the target for post-processing performed on this printed sheet S, the original image data does not need to be transmitted and received between the image forming device 200 and the post-processing device 300. Therefore, signal transmission in a unique format does not need to be performed using a non-general purpose protocol between the image forming device 200 and the post-processing device 300, and signal transmission with a large amount of data does not need to be performed, either. Accordingly, a configuration for suppressing the outputting in still an inappropriate state of the printed sheet S already post-processed can be realized with the content with a low burden in terms of both configuration and processing.

Furthermore, in the present embodiment, the post-processing control unit 340 of the post-processing device 300 notifies, by a stoppage notification, the image forming device 200 of the fact that the post-processing by the post-processing unit 350 has been stopped. Moreover, the post-processing control unit 340 notifies, by a stoppage release notification, the image forming device 200 of a page of the printed sheet S whose post-processing has been stopped.

Therefore, when an original content of the printed sheet S output from the image forming device 200, which is captured by the CCD camera 360, does not coincide with the content of an original image indicated by the PDL data of the original of a print job, a notification of a page of the original at this time is provided to the image forming device 200, so that the image forming device 200 can recognize a print resumption page of the original from the notified page. Thus, in the case where the printing of the original in the image forming device 200 and the post-processing of the printed sheet S in the post-processing device 300 are stopped due to a print failure or the like, the printing and post-processing can be promptly resumed from an appropriate stage. That is, not only in the normal operation but also in the operation during resumption, the image forming device 200 and the post-processing device 300 can be interlocked.

Moreover, in the present embodiment, when there is post-processing to be performed in the post-processing device 300, a print job having job data described by a page description language of the extended format including an attribute of post-processing is output to the post-processing device 300, and PDL data of an original is extracted from the print job and is output to the image forming device 200 from the post-processing device 300. On the other hand, when there is no post-processing to be performed in the post-processing device 300, PDL data of an original is output to the image forming device 200 as the print job.

Therefore, when there is no setting for post-processing and the image forming device 200 can describe a print job by a page description language of a general-purpose format having interface compatibility, the throughput from the generation of a print job to the output of the printed sheet S can be reduced by directly outputting the print job to the image forming device 200 without via the post-processing device 300.

Note that, the configuration for stopping post-processing based on a result of the collation of an original image on the printed sheet S with an original image on data, the configuration for providing a notification of stoppage and an original page at the time of the stoppage from the post-processing device 300 to the image forming device 200, and the configuration in which the computer 100 outputs a print job to the image forming device 200 when there is no setting for post-processing may be individually omitted, respectively. However, in the case where the configuration for stopping post-processing based on a result of the collation of the original images is omitted, the configuration for providing a notification of the stoppage of post-processing and an original page at the time of the stoppage will be also omitted.

In the foregoing, the embodiment of the present invention has been described, but the embodiment is illustrative only and described for ease of understanding of the present invention, and the present invention is not limited to the embodiment. The technical scope of the present invention includes not only the specific technical items disclosed in the above-described embodiment but also various variants, modifications, alternative techniques and the like that may be easily derived therefrom.

The present application is based upon and claims the benefit of priority from Japanese Patent Application No. 2013-039499, filed on Feb. 28, 2013, the entire content of which are incorporated herein by reference.

INDUSTRIAL APPLICABILITY

According to the present invention, even if an image forming device to be connected does not have interface compatibility, post-processing of the content that is defined by a print job based on PDL data of the extended data structure can be performed.

What is claimed is:

1. A printing system comprising:
a processor;
an image former configured to print original image data; and
a post-processor configured to post-process a printed sheet of the image former, wherein:
the processor is configured to generate:
original page description language (PDL) data regarding a print of the original image data, based on a setting item related to the image former, and
post-processing PDL data based on a setting item related to the post-processor,
the processor is further configured to send a print job of PDL data including the original PDL data and the post-processing PDL data to the post-processor,
the post-processor is configured to extract the post-processing PDL data from the print job,
the post-processor is further configured to send the original PDL data without the post-processing PDL data to the image former,
the image former is configured to print the original image data based on the original PDL data,
the image former is further configured to feed the printed sheet to the post-processor, and
the post-processor is further configured to post-processes the printed sheet based on the post-processing PDL data.

2. The printing system according to claim 1, wherein the post-processor further comprises:
an original image data acquirer configured to acquire the original image data from the printed sheet to obtain acquired original image data;
an original image data generator configured to generate the original image data from the original PDL data that was output to the image former to obtain generated original image data;
a collator configured to collate the acquired original image data with the generated original image data; and
a stopper configured to stop post-processing of the post-processor when a result of collation of the acquired original image data with the generated original image data indicates non-coincidence.

3. The printing system according to claim 2, wherein the post-processor further comprises:
a stoppage notifier configured to notify the image former of a stoppage of post-processing by the post-processor and of a page of the acquired original image data and the generated original image data, which do not coincide with each other as the result of collation by the collator.

4. A printing method for printing original image data by an image former and post-processing a printed sheet of the image former by a post-processor, comprising:
generating original page description language (PDL) data regarding a print of the original image data, based on a setting item related to the image former;
generating post-processing PDL data based on setting item related to the post-processor,
sending a print job of PDL data, including the original PDL data and the post-processing PDL data, to the post-processor;
extracting the post-processing PDL data from the print job at the post-processor,
sending the original PDL data without the post-processing PDL data from the post-processor to the image former;
printing the original image data based on the original PDL data;
feeding the printed sheet from the image former to the post-processor; and
post-processing the printed sheet based on the post-processing PDL data.

* * * * *